Patented Apr. 18, 1939

2,155,369

UNITED STATES PATENT OFFICE 2,155,369

COMPOUNDS OF THE PYRAZOLANTHRONE SERIES

Myron S. Whelen, Milwaukee, Wis., assignor to E. I. du Pont de Nemours & Company, Wilmington, Del., a corporation of Delaware No Drawing. Application February 24, 1936, Serial No. 65,430

2 Claims. (Cl. 260—312)

This invention relates to the preparation of new compounds of the pyrazolanthrone series. More particularly the invention relates to the preparation of 6-halogen-pyrazolanthrone and new halogen-containing dipyrazolanthrone dyestuffs obtainable therefrom.

2-bromo-1,9-pyrazolanthrones and 2-halogen-N-alkyl-1,9-pyrazolanthrones have been prepared according to German patent 171,293 and U. S. Patent 1,804,532. These compounds, however, on alkaline condensation form dyestuffs which are substantially free from halogen.

Dipyrazolanthrone and its alkyl derivatives have been chlorinated to form dyestuffs containing two atoms of chlorine according to U. S. Patent 1,595,549. While the position of the halogen has not been designated it is believed that it enters an alpha position of the anthrone nucleus probably para to the pyrazole nitrogen. These chlorine-containing N - N - dialkyl - dipyrazolanthrones have improved properties but still dye in bluish-red shade.

It is an object of my invention to produce new halogen substituted 1,9 - pyrazolanthrones which are valuable dyestuff intermediates. It is a further object to prepare new halogen-containing dyestuffs of the pyrazolanthrone series which dye in more desirable shades than those heretofore obtained, and which have improved printing properties.

According to this invention a 1-amino-6-halogen-anthraquinone is converted to the corresponding pyrazole by diazotization and conversion to the 1-hydrazino-6-halogen-anthraquinone followed by ringclosure to the 6-halogen-pyrazolanthrone. The diazotization, reduction to the hydrazine, and pyrazole ringclosure may be carried out by the methods generally used for the preparation of pyrazolanthrone from 1-aminoanthraquinone.

The following examples are given to more fully illustrate my invention. The parts used are by weight.

Example 1

9 parts of 6-chloro-anthraquinone-1-hydrazine obtained by the diazotization and reduction of 1-amino-6-chloro-anthraquinone are dissolved in 60 parts of concentrated sulfuric acid, and the whole is heated to about 100° C. for several hours. It is then cooled and diluted with water to an acid concentration of about 50–55%. The precipitated 6 - chloro - pyrazolanthrone is then filtered off, washed with 50% sulfuric acid, then with water until acid free. When dried and pulverized it is a greenish-olive powder soluble in concentrated sulfuric acid with a pale yellow color. On recrystallization from nitrobenzene it has a melting point of 273.5–275° C.

The 6-bromo-1,9-pyrazolanthrone and the 6-fluoro-pyrazolanthrone may be prepared by the same procedure outlined for the preparation of the 6-chloro-pyrazolanthrone by starting with the corresponding 1-amino-6-bromo (or 6-fluoro)-anthraquinone.

Example 2

10 parts of 6-chloro-pyrazolanthrone prepared according to Example 1 are fused with 40 parts of flaked caustic potash and 40 parts of ethyl alcohol at 100° C. for about two hours. The resulting compound is isolated as the dipotassium salt by drowning the mass in water, blowing with air, filtering and washing. The fusion may be carried out at temperatures as high as 150° C. by decreasing the time of heating to from ¼ to ½ hour. However, heating at the higher temperatures for too long a time tends to split off chlorine from the resulting dyestuff.

The dipotassium salt of the dipyrazolanthrone may be converted to the free base by acidification.

The 6-bromo or 6-fluoro-pyrazolanthrones may be similarly fused with alcoholic potash to give the corresponding bromo- or fluoro-dipyrazolanthrone compounds.

Example 3

10 parts of the dipotassium salt of the chloro-dipyrazole-dianthrone, prepared by the process of Example 2, are suspended in 100 parts of nitrobenzene, 10 parts of anhydrous sodium carbonate are then added and the mass is heated with good agitation to 180° C. 10 parts of diethyl sulfate are then slowly added over the course of several hours at 180–185° C. and the reaction is held at this temperature for an additional hour. It is then cooled to 90° C. and filtered. The product is washed with nitrobenzene, alcohol, and hot water in turns. The N-N-diethyl-dipyrazolanthrone is obtained in the form of fine bronzy needles. It contains from 3 to 9% chlorine, depending upon the temperature and time employed in the fusion step. It dyes cotton clear red shades from a greenish-blue hydrosulfite vat. The dyeings are much brighter and much yellower than those obtained from the corresponding non-halogenated derivative.

Example 4

10 parts of the dipotasssium salt of the chloro-dipyrazolanthrone, prepared as in Example 2, are suspended in 100 parts of nitrobenzene, 10 parts of sodium carbonate are added and the mass is heated with good agitation to 180° C. 10 parts of dimethyl sulfate are then slowly added over the course of several hours at 180–185° C. The reaction is heated at this temperature for an additional hour, then cooled to 90° C. and filtered. The product, after washing with nitrobenzene, alcohol, and water, in turns, is obtained in the form of fine bronzy needles. It dyes cotton in clear red shades from a greenish-blue vat.

The halogen-dipyrazolanthrone in the form of the free base may be alkylated in the same manner as the dipotassium salt specifically mentioned in the above examples.

In general, the fusion of the 6-chloro-pyrazolanthrone to the dipyrazolanthrone and the alkylation of these new halogen-containing dipyrazolanthrones may be carried out by the methods usually employed for the condensation and alkylation of pyrazolanthrones.

I claim:
1. As new compounds, 6- halogen - 1,9 - pyrazolanthrones.
2. As a new compound, 6-chloro-1,9 - pyrazolanthrone.

MYRON S. WHELEN.